(12) United States Patent
Kalhan (10) Patent No.: US 10,945,162 B2
(45) Date of Patent: Mar. 9, 2021

(54) SPECIAL UPLINK SUBFRAME FOR ENHANCED MOBILITY

(71) Applicants: Kyocera Corporation, Kyoto (JP); Amit Kalhan, San Diego, CA (US)

(72) Inventor: Amit Kalhan, San Diego, CA (US)

(73) Assignee: Kyocera Corporation, Kyoto (JP)

(*) Notice: Subject to any disclaimer, the term of this patent is extended or adjusted under 35 U.S.C. 154(b) by 0 days.

(21) Appl. No.: 16/335,177

(22) PCT Filed: Sep. 28, 2017

(86) PCT No.: PCT/US2017/054102
§ 371 (c)(1),
(2) Date: Mar. 20, 2019

(87) PCT Pub. No.: WO2018/064381
PCT Pub. Date: Apr. 5, 2018

(65) Prior Publication Data
US 2019/0281505 A1 Sep. 12, 2019

Related U.S. Application Data

(60) Provisional application No. 62/402,526, filed on Sep. 30, 2016.

(51) Int. Cl.
*H04W 36/00* (2009.01)
*H04W 52/40* (2009.01)
(Continued)

(52) U.S. Cl.
CPC ....... *H04W 36/0005* (2013.01); *H04L 5/0048* (2013.01); *H04L 5/0091* (2013.01);
(Continued)

(58) Field of Classification Search
CPC ......... H04W 36/0005; H04W 36/0055; H04W 36/0058; H04W 36/0072; H04W 36/08;
(Continued)

(56) References Cited

U.S. PATENT DOCUMENTS

2002/0045451 A1* 4/2002 Hwang ............. H04W 36/0072
455/442
2009/0168723 A1* 7/2009 Meylan ................. H04L 1/1841
370/331

(Continued)

*Primary Examiner* — Kevin D Mew (57) ABSTRACT

A user equipment (UE) device is scheduled to transmit an uplink data transmission to its serving base station. The uplink data transmission includes a special subframe that has a different subframe structure than a subframe structure used by at least one other UE device being served by the serving base station. For example, the special subframe includes a blanked portion of the first symbol of the special subframe and a higher Reference Signal symbol density when compared to the subframe structure used by other UE devices. A target base station receives and decodes the uplink data transmission, utilizing the features of the special subframe to acquire and estimate the uplink channel between the UE device and the target base station. After decoding the uplink data transmission, the UE device is handed over from the serving base station to the target base station.

21 Claims, 6 Drawing Sheets

(51) Int. Cl.
*H04W 72/12* (2009.01)
*H04L 5/00* (2006.01)
*H04W 36/08* (2009.01)

(52) U.S. Cl.
CPC ....... *H04W 36/0072* (2013.01); *H04W 36/08* (2013.01); *H04W 52/40* (2013.01); *H04W 72/1268* (2013.01)

(58) Field of Classification Search
CPC ............. H04W 52/40; H04W 72/1263; H04W 72/1268; H04L 5/0048; H04L 5/0091
See application file for complete search history.

(56) References Cited

U.S. PATENT DOCUMENTS

| | | | |
|---|---|---|---|
| 2010/0208696 A1 | 8/2010 | Lee et al. | |
| 2010/0222068 A1* | 9/2010 | Gaal | H04W 56/0005 455/450 |
| 2010/0232327 A1* | 9/2010 | Kim | H04W 36/36 370/311 |
| 2010/0265968 A1* | 10/2010 | Baldemair | H04L 27/2662 370/503 |
| 2010/0279695 A1* | 11/2010 | Amirijoo | H04W 36/0079 455/438 |
| 2010/0317345 A1* | 12/2010 | Futaki | H04W 36/08 455/436 |
| 2011/0007719 A1* | 1/2011 | Lee | H04W 56/0045 370/336 |
| 2011/0032907 A1* | 2/2011 | Sahara | H04L 5/0044 370/331 |
| 2011/0058529 A1* | 3/2011 | Uemura | H04W 36/0077 370/331 |
| 2012/0178482 A1* | 7/2012 | Seo | H04L 1/1854 455/501 |
| 2013/0286907 A1 | 10/2013 | Wei et al. | |
| 2013/0343345 A1* | 12/2013 | Dinan | H04W 36/0055 370/332 |
| 2014/0140315 A1* | 5/2014 | Kim | H04W 72/1268 370/329 |
| 2014/0185539 A1 | 7/2014 | Seo et al. | |
| 2014/0254509 A1 | 9/2014 | Chen et al. | |
| 2014/0313969 A1* | 10/2014 | Kalhan | H04W 36/0072 370/312 |
| 2015/0003399 A1 | 1/2015 | Ji et al. | |
| 2015/0103819 A1* | 4/2015 | Fujishiro | H04W 56/001 370/350 |
| 2015/0208283 A1* | 7/2015 | Yang | H04L 47/34 370/331 |
| 2015/0223124 A1* | 8/2015 | Wang | H04W 24/08 455/436 |
| 2015/0245327 A1* | 8/2015 | Damnjanovic | H04W 24/08 370/336 |
| 2015/0282207 A1* | 10/2015 | Ambriss | H04W 36/0055 370/331 |
| 2016/0157199 A1* | 6/2016 | Senoo | H04W 56/0055 370/350 |
| 2016/0174124 A1* | 6/2016 | Basu Mallick | H04W 36/0005 370/331 |
| 2017/0359790 A1* | 12/2017 | Wang | H04J 11/005 |

\* cited by examiner

SPECIAL UPLINK SUBFRAME FOR ENHANCED MOBILITY

CLAIM OF PRIORITY

The present application claims priority to Provisional Application No. 62/402,526, entitled "Special Uplink Subframe for Enhanced Mobility", filed Sep. 30, 2016, assigned to the assignee hereof and hereby expressly incorporated by reference in its entirety.

FIELD

This invention generally relates to wireless communications and more particularly to the handover of user equipment devices between base stations.

BACKGROUND

In a conventional handover, after a user equipment (UE) device is handed over from a serving base station to a target base station, the UE device ceases uplink data transmissions until the UE device (1) is synchronized to the target base station, and (2) has any other required resources to obtain uplink access to the target base station. In order to synchronize with the target base station, the UE device transmits an uplink signal to the target base station, which uses the received uplink signal to calculate a Timing Advance (TA). The TA is needed in order for the UE device's uplink transmissions to be synchronized to the target base station. The target base station signals the TA, along with any other resources needed for the UE device to obtain uplink access to the target base station, directly or indirectly to the UE device.

SUMMARY

A user equipment (UE) device is scheduled to transmit an uplink data transmission to its serving base station. The uplink data transmission includes a special physical structure that is different than a physical structure used by at least one other UE device being served by the serving base station. For the examples in which a special subframe physical structure is used, the special subframe includes (1) a blanked portion of the first symbol of the special subframe, and/or (2) a higher Reference Signal symbol density when compared to the subframe structure used by other UE devices. A target base station receives and decodes the uplink data transmission, utilizing the features of the special subframe to acquire and estimate the uplink channel between the UE device and the target base station. After decoding the uplink data transmission, the UE device is handed over from the serving base station to the target base station.

DETAILED DESCRIPTION

One drawback of a traditional handover of a user equipment (UE) device from a serving base station to a target base station is that there is a lack of data communication-continuity. For example, in a conventional handover, after the UE device is handed over to the target base station, the UE device necessarily ceases uplink data transmissions until the UE device (1) is synchronized to the target base station, and (2) has any other required resources to obtain uplink access to the target base station. In order to synchronize with the target base station, the UE device transmits an uplink signal, such as a Random Access Channel (RACH) signal, to the target base station, which uses the received uplink signal to calculate a Timing Advance (TA). The TA is needed in order for the UE device's uplink transmissions to be synchronized to the target base station. The target base station signals the TA, along with any other resources needed for the UE device to obtain uplink access to the target base station, directly or indirectly to the UE device.

One of the advantages of the examples described herein is that the target base station can acquire uplink timing of the UE device from an uplink data transmission that the UE device is sending to the serving base station. Thus, the UE device does not need to cease uplink data transmissions, as would be the case in a traditional handover in order for the target base station to determine a Timing Advance ($TA_{target}$) for the UE device with respect to the target base station. Therefore, the additional latency experienced in traditional handovers is reduced. Moreover, since the UE device has the $TA_{target}$ upon completion of the handover, the UE device may continue sending uplink data transmissions, using the $TA_{target}$ and the other resources needed for the UE device to obtain uplink access to the target base station, in an uninterrupted manner. Thus, the examples described herein advantageously allow data communication-continuity during and after the handover process.

Figure 1:
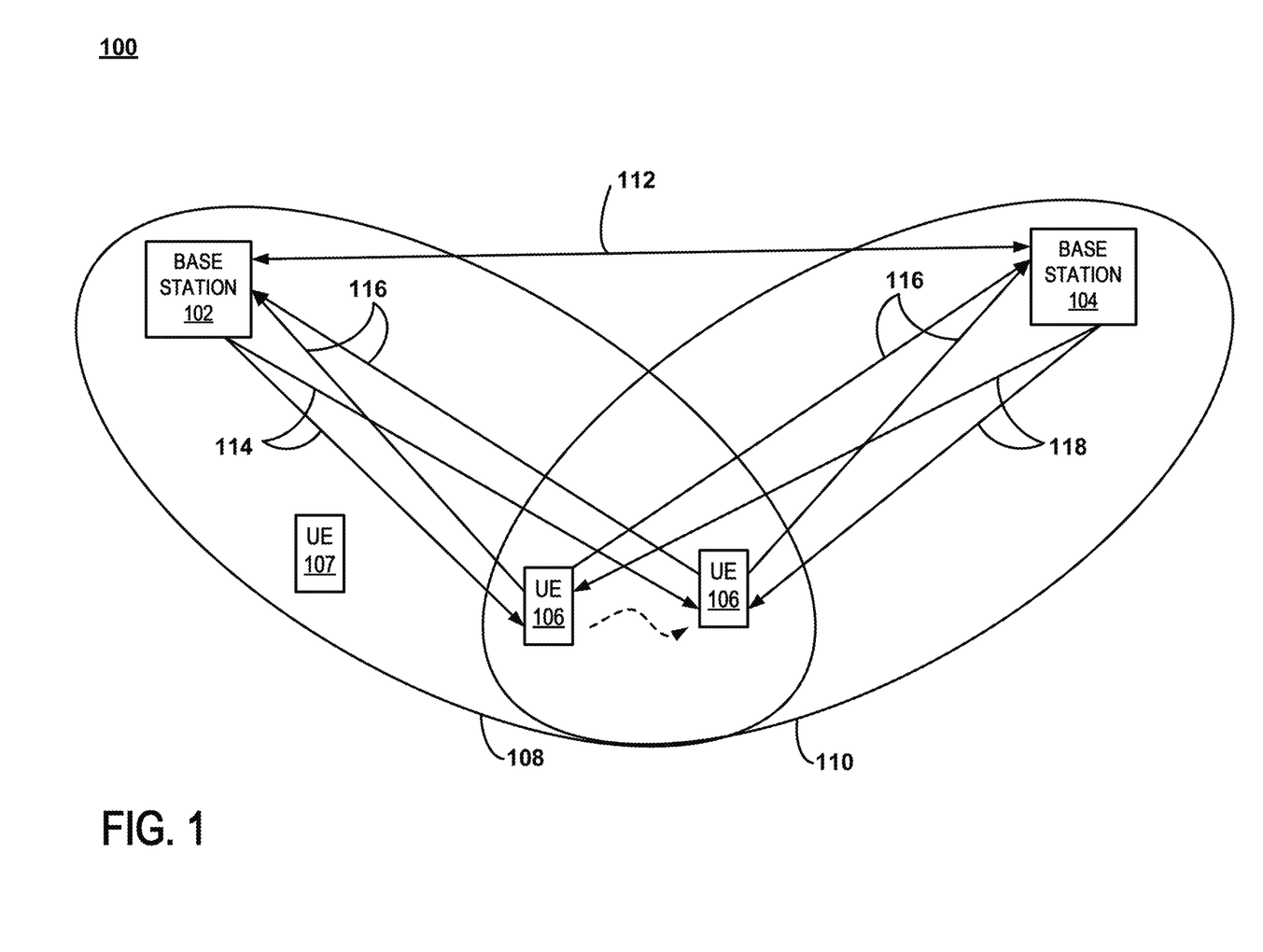
FIG. 1 is a block diagram of a communication system for an example in which a UE device transmits an uplink data transmission, comprising a special subframe, which allows the target base station to decode the uplink data transmission without having a measurement-based uplink timing for the UE device.

FIG. 1 is a block diagram of a communication system for an example in which a UE device transmits an uplink data transmission, comprising a special subframe, which allows the target base station to decode the uplink data transmission without having a measurement-based uplink timing for the UE device (e.g., without having an uplink timing for the UE device that was measured by the target base station prior to receiving the uplink data transmission). Although the examples described herein refer to a "special subframe," in other examples, the uplink data transmission could have any alternative special physical structure that is different than a physical structure used by the other UE devices being served by the serving base station. The communication system 100 is part of a radio access network (not shown) that provides various wireless services to UE devices that are located within the respective service areas of the various base stations that are part of the radio access network.

In the interest of clarity and brevity, communication system 100 is shown as having only serving base station 102 and target base station 104. However, in other examples, communication system 100 could have any suitable number of base stations. In the example of FIG. 1, at least a portion of the service area for serving base station 102 is represented by cell 108, and at least a portion of the service area for target base station 104 is represented by cell 110. Cells 108, 110 are represented by ovals, but a typical communication system 100 would have a plurality of cells, each having variously shaped geographical service areas. Base stations 102, 104, sometimes referred to as eNodeBs or eNBs, communicate with the wireless user equipment (UE) device 106 by respectively transmitting downlink signals 114, 118 to UE device 106. Base stations 102, 104 receive uplink signals 116 transmitted from the UE device 106. The UE device 106 is any wireless communication device such as a mobile phone, a transceiver modem, a personal digital assistant (PDA), or a tablet, for example.

Figure 2A:
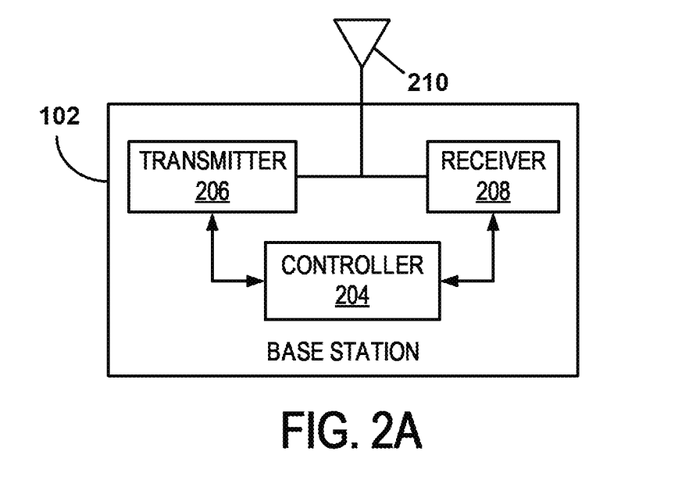
FIG. 2A is a block diagram of an example of the base station shown in FIG. 1.

Base stations 102, 104 are connected to the network through a backhaul (not shown) in accordance with known techniques. As shown in FIG. 2A, serving base station 102 comprises controller 204, transmitter 206, and receiver 208, as well as other electronics, hardware, and code. Although FIG. 2A specifically depicts the circuitry and configuration of serving base station 102, the same base station circuitry and configuration is utilized for target base station 104 in communication system 100. The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals 114 and can apply any one of a plurality of modulation orders. The demodulator demodulates any uplink signals 116 received at the base station 102 in accordance with one of a plurality of modulation orders.

Figure 2B:
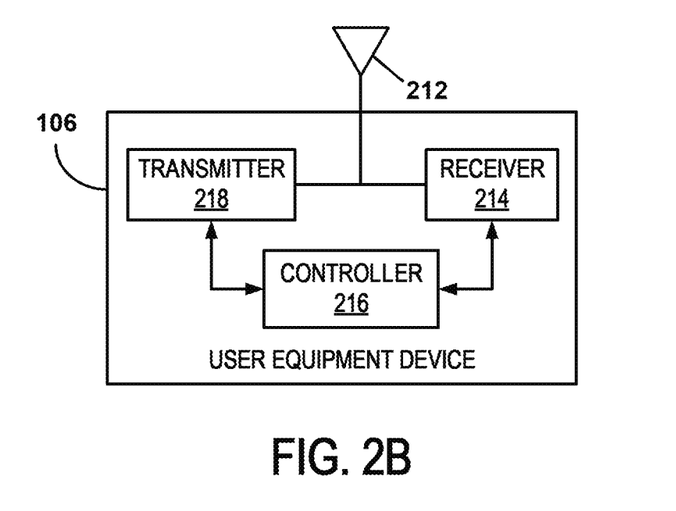
FIG. 2B is a block diagram of an example of the UE device shown in FIG. 1.

Returning to FIG. 1, the communication system 100 provides various wireless services to UE device 106 via base stations 102, 104. For the examples herein, the communication system 100 operates in accordance with at least one revision of the 3rd Generation Partnership Project Long Term Evolution (3GPP LTE) communication specification. UE device 106 is initially served by serving base station 102 and, thus, receives downlink signals 114 via antenna 212 and receiver 214, as shown in FIG. 2B. Besides antenna 212 and receiver 214, UE device 106 further comprises controller 216 and transmitter 218, as well as other electronics, hardware, and code. UE device 106 is any fixed, mobile, or portable equipment that performs the functions described herein. The various functions and operations of the blocks described with reference to UE device 106 may be implemented in any number of devices, circuits, or elements. Two or more of the functional blocks may be integrated in a single device, and the functions described as performed in any single device may be implemented over several devices.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device.

The transmitter 218 includes a modulator (not shown), and the receiver 214 includes a demodulator (not shown). The modulator can apply any one of a plurality of modulation orders to modulate the signals to be transmitted as part of the uplink signals 116, which are shown in FIG. 1. The demodulator demodulates the downlink signals 114, 118 in accordance with one of a plurality of modulation orders.

At the beginning of operation of the example shown in FIG. 1, the UE device 106 is being served by serving base station 102. Thus, upon receipt of the downlink signals 114, the UE device 106 demodulates the downlink signals 114, which yields encoded data packets that contain data pertaining to at least one of the wireless services that the serving base station 102 is providing to the UE device 106. The UE device 106 decodes the encoded data packets, using controller 216, to obtain the data. As operation progresses in FIG. 1, the UE device 106 moves closer to the outer edge of cell 108 of serving base station 102 and closer towards the center of cell 110 of target base station 104. The movement of UE device 106 is illustrated by a dashed arrow in FIGS. 1 and 3.

Any one or more suitable criteria may be used to determine whether serving base station 102 should hand the UE device 106 over to target base station 104. The criteria may include, for example, radio congestion at serving base station 102, poor/deteriorating signal quality for the uplink/ downlink signals between the UE device 106 and the serving base station 102, good/increasing signal quality for the uplink/downlink signals between the UE device 106 and the target base station 104, and/or underutilization of available resources by target base station 104. However, any other suitable criteria could be used.

Figure 3:
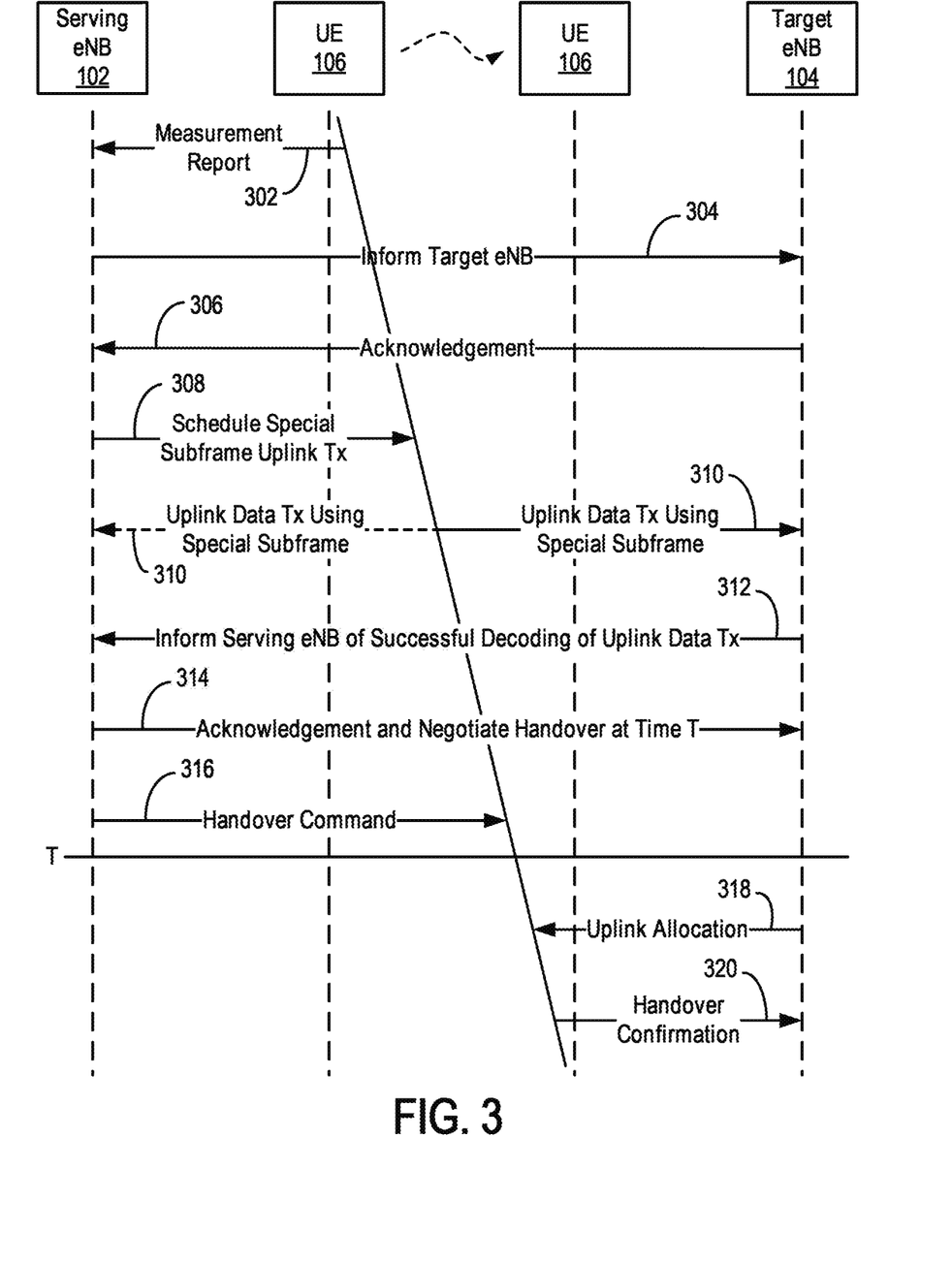
FIG. 3 is a messaging diagram of an example of the messages exchanged between the various system components shown in FIG. 1.

In the example shown in FIG. 1, the criteria used to determine whether to hand the UE device 106 over to the target base station 104 includes a measurement report transmitted by the UE device 106 and received by the serving base station 102. The measurement report is based on measurements made by the UE device 106 of Reference Signal (RS) signals received from one or more neighboring base stations. In the example of FIG. 1, the measurement report contains Channel State Information (CSI) pertaining to the RS signal sent by target base station 104. The transmission of the measurement report is represented in FIG. 3 by signal 302. The serving base station 102 utilizes the measurement report, along with any other suitable criteria, to determine whether to hand over the UE device 106 to the target base station 104. In the example shown in FIG. 1, the serving base station 102 determines that the UE device 106 should be handed over to the target base station 104.

After determining that the UE device 106 should be handed over to the target base station 104, the serving base station 102 transmits a message informing the target base station 104 that UE device 106 will be transmitting an uplink data transmission. The message can be sent via a wired connection (e.g., X2) or a wireless communication link. In the example shown in FIG. 1, the message informing the target base station 104 that UE device 106 will be transmitting an uplink data transmission is sent via the wired communication link 112.

The transmission of the message that the UE device 106 will be transmitting an uplink data transmission is represented in FIG. 3 by signal 304. The message contains all relevant information needed by the target base station 104 to decode the uplink data transmission such as: a UE identifier (UE ID), transmission resources (e.g., frequency and time-slots), transmission format, modulation order, modulation technique, coding rate, spreading code, and/or any other information that could be useful to the target base station 104. In one example, the UE ID is a Cell Radio Network Temporary Identifier (C-RNTI). In other examples, the relevant information needed by the target base station 104 to decode the uplink data transmission is predetermined, and the target base station 104 already knows of the special subframe structure that will be utilized by UE device 106. In these cases, the serving base station 102 can send the UE ID and any necessary transmission resource information (e.g., frequency and time-slots) to the target base station 104 to use in decoding the uplink data transmission.

The target base station 104 transmits, via wired communication link 112, an acknowledgement to the serving base station 102, indicating that the target base station 104 successfully received the message that the UE device 106 will be transmitting an uplink data transmission. The acknowledgement is represented in FIG. 3 by signal 306. Upon receipt of the acknowledgement, the serving base station 102 schedules UE device 106 to transmit an uplink data transmission that includes a special subframe, which will be discussed more fully below. The scheduling of the uplink data transmission is represented in FIG. 3 by signal 308. The UE device 106 is scheduled to transmit the uplink data transmissions, which include the special subframe, until the target base station 104 has successfully decoded at least one uplink data transmission from the UE device 106.

The uplink data transmission includes a special subframe that has a different subframe structure than a subframe structure being used by least one other UE device (e.g., UE device 107 in FIG. 1) being served by the serving base station 102. For the example shown in FIG. 1, the special subframe includes (1) a first symbol that is at least partially blanked, and (2) at least one additional Reference Signal (RS) symbol, which is not included in the subframe structure being used by at least one other UE device being served by the serving base station 102. Of course, the special subframe may have any other suitable subframe structure, so long as the subframe structure (1) ensures collision avoidance between the special subframe and the subframes being transmitted by other UE devices being served by the serving base station 102, and (2) facilitates the target base station 104 acquiring and estimating the uplink channel between the UE device 106 and the target base station 104.

Figure 2C:
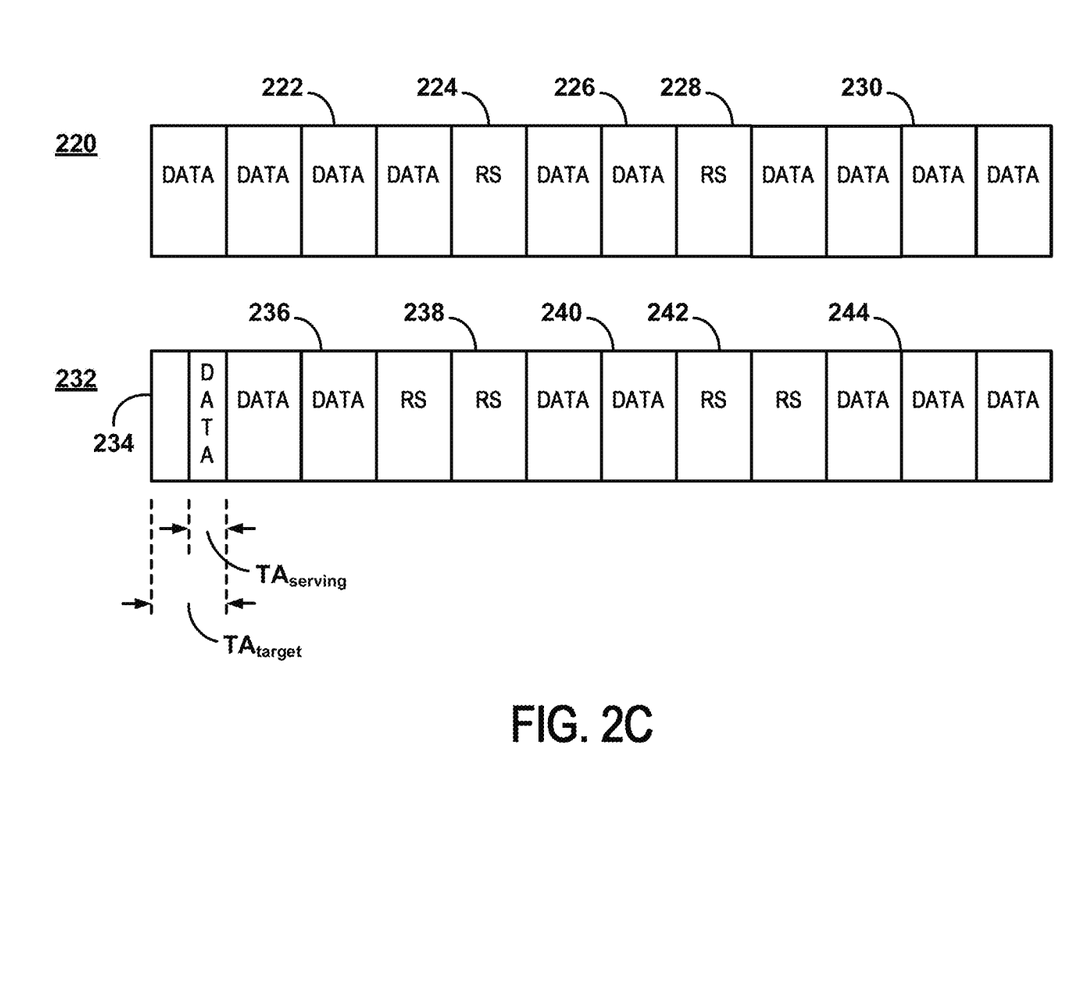
FIG. 2C is a block diagram showing a comparison between an example of the special subframe used by UE device in FIG. 1 and a subframe used by another UE device being served by the serving base station.

FIG. 2C is a block diagram showing a comparison between an example of the special subframe used by UE device 106 and a subframe used by UE device 107, which is also being served by the serving base station 102. For example, FIG. 2C shows subframe 220, which is used by UE device 107. Subframe 220 includes first data region 222 and third data region 230, which each have four data symbols. Subframe 220 also includes second data region 226, which has two data symbols. Subframe 220 further includes first Reference Signal (RS) region 224 and second RS region 228, which each have one RS symbol.

FIG. 2C also shows special subframe 232, which is used by UE device 106. Special subframe 232 includes first data region 236. Unlike first data region 222 of subframe 220, the first symbol of first data region 236 is partially blanked (e.g., contains no data symbol). In other examples, the first symbol of the first data region 236 may have a smaller or a larger portion of the first symbol blanked than is shown in the example of FIG. 2C, and in some cases, the entire first symbol of the first data region 236 may be blanked. In still other examples, the first symbol may also, or alternatively, include a preamble and/or an RS symbol.

In the example shown in FIG. 2C, the amount of the first symbol of the special subframe 232 that should be blanked is determined, at least partially, based on a Timing Advance ($TA_{target}$) for the UE device 106 with respect to the target base station 104. The $TA_{target}$ can be determined by either the UE device 106 or by the serving base station 102. If the $TA_{target}$ is determined by the UE device 106, the UE device 106 utilizes transmitter 218 and antenna 212 to transmit the determined $TA_{target}$ to the serving base station 102. If the $TA_{target}$ is determined by the serving base station 102 with assistance from the UE device 106, the serving base station 102 transmits the determined $TA_{target}$ to the UE device 106. In some examples, the serving base station 102 also transmits the determined $TA_{target}$ to the target base station 104 to facilitate acquisition and estimation of the uplink channel between the UE device 106 and the target base station 104 (e.g., from the uplink data transmission). However, since the determined $TA_{target}$ is only an approximation, the target base station 104 may still require the additional one or more RS symbols in the special subframe 232 to acquire a more accurate uplink timing measurement than that provided by $TA_{target}$.

Regardless of how $TA_{target}$ is determined, the UE device 106 utilizes $TA_{target}$ to determine the amount of the first symbol of the special subframe 232 that should be blanked. The UE device 106 determines that the blanked portion of the first symbol of the special subframe 232 should begin at the front edge of the first symbol and extend for a duration period $t_{blank}$, where $(TA_{target}-TA_{serving}) \leq t_{blank} \leq$ one symbol duration, where $TA_{serving}$ is a Timing Advance for the UE device 106 with respect to the serving base station 102. When calculating $t_{blank}$, $TA_{target} \geq TA_{serving}$ if the distance between the UE device 106 and the target base station 104 is larger than the distance between the UE device 106 and the serving base station 102; however, in scenarios in which this is not the case, $TA_{target}=TA_{serving}$. For the example shown in FIG. 2C, the blanked portion, $t_{blank}$, of the first symbol of the special subframe 232 is equal to $(TA_{target}-TA_{serving})$.

The special subframe 232 has a second data region 240 and a third data region 244, which have two data symbols and three data symbols, respectively. Special subframe 232 further includes first RS region 238 and second RS region 242, which each have two RS symbols. Thus, the first RS region 238 and the second RS region 242 of special subframe 232 have a greater number of RS symbols than the first RS region 224 and the second RS region 228 of subframe 220, which each have one RS symbol. However, in other examples, the special subframe 232 and/or the RS regions 238, 242 may have the same number of RS symbols as contained in subframe 220 and/or RS regions 224, 228, respectively.

Therefore, the special subframe 232 has a higher RS symbol density than subframe 220. Although the example of FIG. 2C shows additional RS symbols in both RS regions 238, 242 of special subframe 232 when compared to the first and second RS regions 224, 228 of subframe 220, only one additional RS symbol is required in special subframe 232 when compared to subframe 220. In this regard, the additional one or more RS symbols in special subframe 232 may be located in any suitable location within special subframe 232.

Although the foregoing description has focused on RS symbols, in other examples, any other suitable preamble with a known sequence may be utilized in place of one or more of the RS symbols. Moreover, the data symbols and the one or more RS symbols in the special subframe 232 may use an extended cyclic prefix (CP) when a distance between the UE device 106 and the target base station 104 is larger than a radius of a coverage area of the serving base station 102. In alternative examples, the serving base station 102 may schedule other UE devices being served by the serving base station 102 (e.g., UE device 107) to refrain from transmitting their last symbol in the previous subframe instead of blanking at least a portion of the first symbol of the special subframe 232, which would help ensure collision avoidance between the special subframe 232 and the subframes being transmitted by other UE devices being served by the serving base station 102.

The UE device 106 transmits the uplink data transmission as an uplink signal 116, using transmitter 218 and antenna 212. The serving base station 102 and the target base station 104 receive the uplink data transmission using their respective antennas 210 and receivers 208. The uplink data transmission is represented in FIG. 3 by signal 310. In this regard, signal 310 is shown in FIG. 3 as being transmitted to both serving base station 102 and target base station 104 since both base stations are capable of receiving signal 310. Both base stations are the intended recipients of signal 310. Serving base station 102 is intended to receive the uplink data transmission so that the UE device 106 can transmit the data contained in the uplink data transmission, and target base station 104 is intended to receive the uplink data transmission in order to estimate the channel conditions between the UE device 106 and the target base station 104.

Upon receipt of the uplink data transmission, the target base station 104 attempts to decode the uplink data transmission. The features of the special subframe 232 facilitate the decoding of the uplink data transmission by the target base station 104 despite the target base station 104 not having a measurement-based uplink timing for the UE device 106 (e.g., does not have an uplink timing for the UE device 106 that was measured by the target base station 104 prior to receiving the uplink data transmission). The target base station 104 also utilizes the UE device-related information received from the serving base station 102 when attempting to decode the uplink data transmission.

If the target base station 104 is unable to decode the initial uplink data transmission, the target base station 104 can simply wait for a subsequent transmission of one or more uplink data transmissions from the UE device 106 and attempt to decode the subsequent uplink data transmissions. Once the target base station 104 successfully decodes an uplink data transmission, the target base station 104 informs the serving base station 102 that the target base station 104 has successfully decoded the uplink data transmission. The signal informing the serving base station 102 that the target base station 104 successfully decoded the uplink data transmission is represented in FIG. 3 by signal 312.

If, however, the serving base station 102 has not received signal 312 from target base station 104 after a pre-determined number of uplink data transmissions and/or amount of time, the serving base station 102 transmits a request to UE device 106 to increase the transmit power for transmitting one or more of the next uplink data transmissions since one or more previous uplink data transmissions were unsuccessful. In other alternative examples, the target base station 104 transmits a signal to the serving base station 102 if the target base station 104 is unable to decode one or more of the uplink data transmissions from UE device 106. Upon receipt of the signal indicating that the target base station 104 is unable to decode the uplink data transmission, the serving base station 102 transmits a request to UE device 106 to increase the transmit power for transmitting one or more of the next uplink data transmissions since one or more previous uplink data transmissions were unsuccessful. Although the target base station 104 may not be able to successfully receive and/or decode one or more previous uplink data transmissions, any subsequent uplink data transmissions will likely contain different data than the previous uplink data transmissions, presuming that the serving base station 102 was able to decode the previous uplink data transmissions.

Upon receipt of signal 312 informing the serving base station 102 that the target base station 104 successfully decoded the uplink data transmission, serving base station 102 sends an acknowledgement to target base station 104 and begins negotiating the time, T, at which the serving base station 102 will handover UE device 106 to target base station 104. The negotiated handover time, T, is identified by a particular subframe number that identifies when the handover should occur. The acknowledgement and handover negotiations are represented in FIG. 3 by signal 314.

The serving base station 102 transmits a handover command to the UE device 106, instructing UE device 106 to hand itself over to target base station 104 at time T. The handover command is represented in FIG. 3 by signal 316. After the handover occurs at time T, the target base station 104 sends an uplink resource allocation to the UE device 106. The uplink resource allocation is represented in FIG. 3 by signal 318. In response to the uplink resource allocation, the UE device 106 transmits a handover confirmation message to the target base station 104 before the UE device 106 begins transmitting data to the target base station 104. However, in other examples, the handover confirmation message may also include an initial uplink data transmission from the UE device 106 to the target base station 104, where the target base station 104 is an intended recipient of the data contained in the uplink data transmission. The handover confirmation message is represented in FIG. 3 by signal 320.

Figure 4:
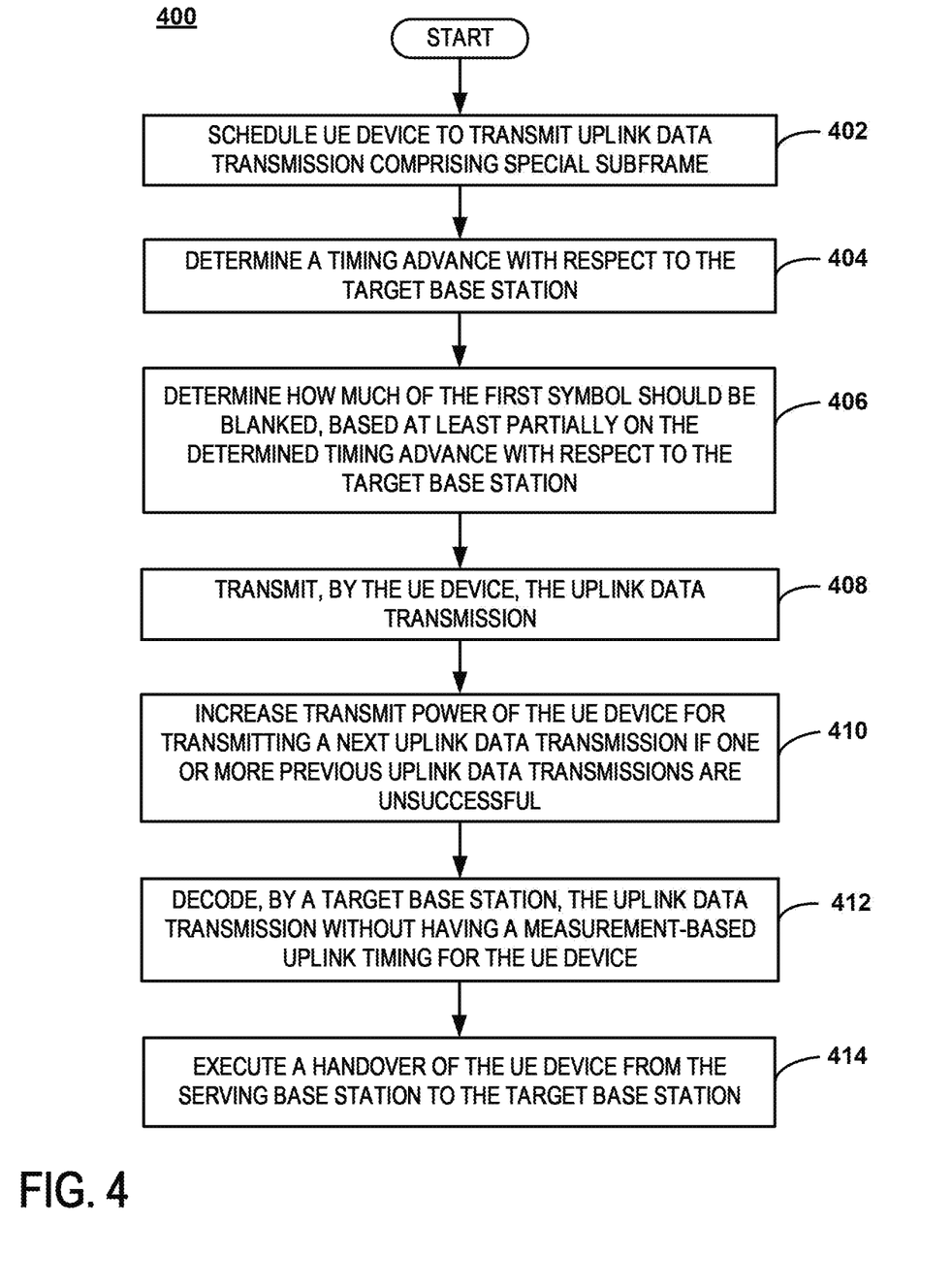
FIG. 4 is a flowchart of an example of a method in which a UE device transmits an uplink data transmission, comprising a special subframe, which allows the target base station to decode the uplink data transmission without having a measurement-based uplink timing for the UE device.

FIG. 4 is a flowchart of an example of a method in which a UE device transmits an uplink data transmission, comprising a special subframe, which allows the target base station to decode the uplink data transmission without having a measurement-based uplink timing for the UE device (e.g., without having an uplink timing for the UE device that was measured by the target base station prior to receiving the uplink data transmission). The method 400 begins at step 402 with scheduling UE device 106, which is being served by serving base station 102, to transmit an uplink data transmission. The uplink data transmission comprises a special subframe 232 that has a different subframe structure than a subframe structure 220 being used by least one other UE device 107 being served by the serving base station 102. The special subframe 232 comprises a first symbol that is at least partially blanked, and at least one additional Reference Signal (RS) symbol, which is not included in the subframe structure 220 being used by the at least one other UE device 107.

The method continues at step 404 with determining a Timing Advance (TA$_{target}$) with respect to the target base station 104. In some examples, TA$_{target}$ is determined by the UE device 106, which transmits the determined TA$_{target}$ to the serving base station 102. In other examples, TA$_{target}$ is determined by the serving base station 102 with assistance from the UE device 106, and the serving base station 102 transmits the determined TA$_{target}$ to the UE device 106.

At step 406, a determination is made regarding how much of the first symbol should be blanked, based at least partially on the determined TA$_{target}$. In some examples, the blanked portion of the first symbol begins at a front edge of the first symbol and lasts for a duration period t-blank, where (TA$_{target}$−TA$_{serving}$)≤t$_{blank}$≤one symbol duration, where TA$_{serving}$ is a Timing Advance for the UE device 106 with respect to the serving base station 102.

At step 408, the UE device 106 transmits the uplink data transmission. At step 410, if one or more previous uplink data transmissions are unsuccessful (e.g., the target base station 104 is unable to receive and/or decode the uplink data transmission), the UE device 106 increases the transmit power for transmitting a next one or more uplink data transmissions. In some examples, the serving base station 102 requests the increase in transmit power from the UE device 106. In other examples, the target base station 104 requests the increase in transmit power from the UE device 106. In still other examples, the UE device 106 can determine for itself that it should increase the transmit power used to transmit the uplink data transmissions.

Upon successful receipt of the uplink data transmission, the target base station 104 decodes, at step 412, the uplink data transmission without having a measurement-based uplink timing for the UE device 106 (e.g., without having an uplink timing for the UE device that was measured by the target base station prior to receiving the uplink data transmission). At step 414, after successfully decoding the uplink data transmission, UE device 106 is handed over from the serving base station 102 to the target base station 104.

Figure 5:
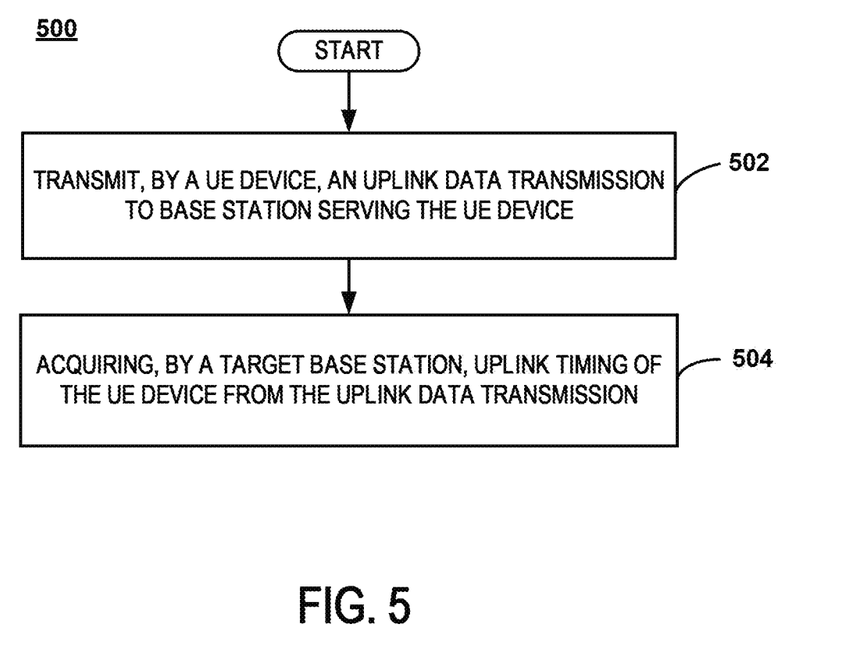
FIG. 5 is a flowchart of an example of a method in which a target base station acquires uplink timing of a UE device from an uplink data transmission.

FIG. 5 is a flowchart of an example of a method in which a target base station acquires uplink timing of a UE device from an uplink data transmission. The method begins at step 502 with UE device 106 transmitting an uplink data transmission to serving base station 102, which is serving the UE device 106. The method continues at step 504 with target base station 104 acquiring the uplink timing of the UE device 106 from the uplink data transmission.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   scheduling a user equipment (UE) device being served by a serving base station to transmit an uplink data transmission, the uplink data transmission comprising a special subframe that has a different subframe structure than a subframe structure being used by at least one other UE device being served by the serving base station, the special subframe comprising a first symbol that is at least partially blanked;
   transmitting, by the UE device, the uplink data transmission;
   decoding, by a target base station, the uplink data transmission without having a measurement-based uplink timing for the UE device; and
   executing a handover of the UE device from the serving base station to the target base station.

2. The method of claim 1, wherein the special subframe further comprises at least one additional Reference Signal (RS) symbol, which is not included in the subframe structure being used by the at least one other UE device.

3. The method of claim 1, further comprising:
determining a Timing Advance ($TA_{target}$) with respect to the target base station.

4. The method of claim 3, wherein $TA_{target}$ is determined by the UE device, which transmits the determined $TA_{target}$ to the serving base station.

5. The method of claim 3, wherein $TA_{target}$ is determined by the serving base station, and the serving base station transmits the determined $TA_{target}$ to the UE device.

6. The method of claim 3, further comprising:
determining how much of the first symbol should be blanked, based at least partially on the determined $TA_{target}$.

7. The method of claim 6, wherein a blanked portion of the first symbol begins at a front edge of the first symbol and lasts for a duration period $t_{blank}$, where $(TA_{target}-TA_{serving}) \leq t_{blank} \leq$ one symbol duration, where $TA_{serving}$ is a Timing Advance with respect to the serving base station.

8. The method of claim 1, wherein data and one or more RS symbols in the special subframe use an extended cyclic prefix (CP) when a distance between the UE device and the target base station is larger than a radius of a coverage area of the serving base station.

9. The method of claim 1, further comprising:
increasing transmit power of the UE device for transmitting a next uplink data transmission if one or more previous uplink data transmissions are unsuccessful.

10. The method of claim 1, further comprising:
transmitting, by the UE device, a handover confirmation message to the target base station, the handover confirmation message comprising uplink data intended for the target base station.

11. A system comprising:
a user equipment (UE) device comprising a transmitter;
a serving base station serving the UE device, the serving base station comprising a controller configured to schedule the UE device to transmit an uplink data transmission, the uplink data transmission comprising a special subframe that has a different subframe structure than a subframe structure being used by at least one other UE device being served by the serving base station, the special subframe comprising a first symbol that is at least partially blanked; and
a target base station comprising:
a receiver configured to receive the uplink data transmission from the UE device, and
a controller coupled to the receiver, the controller configured to:
decode the uplink data transmission without having a measurement-based uplink timing for the UE device, and
negotiate a handover of the UE device from the serving base station to the target base station.

12. The system of claim 11, wherein the special subframe further comprises at least one additional Reference Signal (RS) symbol, which is not included in the subframe structure being used by the at least one other UE device.

13. The system of claim 11, wherein the UE device further comprises a controller configured to determine a Timing Advance ($TA_{target}$) with respect to the target base station, and wherein the transmitter of the UE device is configured to transmit the determined $TA_{target}$ to the serving base station.

14. The system of claim 11, wherein the controller of the serving base station is further configured to determine a Timing Advance ($TA_{target}$) with respect to the target base station, the serving base station further comprising a transmitter configured to transmit the determined $TA_{target}$ to the UE device.

15. The system of claim 11, wherein the serving base station further comprises a transmitter configured to transmit, to the UE device, a Timing Advance ($TA_{serving}$) with respect to the serving base station.

16. The system of claim 11, wherein the controller of the serving base station is further configured to determine how much of the first symbol should be blanked, based at least partially on a Timing Advance ($TA_{target}$) with respect to the target base station.

17. The system of claim 16, wherein a blanked portion of the first symbol begins at a front edge of the first symbol and lasts for a duration period $t_{blank}$, where $(TA_{target}-TA_{serving}) \leq t_{blank} \leq$ one symbol duration, where $TA_{serving}$ is a Timing Advance with respect to the serving base station.

18. The system of claim 11, wherein data and one or more RS symbols in the special subframe use an extended cyclic prefix (CP) when a distance between the UE device and the target base station is larger than a radius of a coverage area of the serving base station.

19. The system of claim 11, wherein the UE device further comprises a controller configured to increase transmit power of the UE device for transmitting a next uplink data transmission if one or more previous uplink data transmissions are unsuccessful.

20. A target base station comprising:
a receiver configured to receive, from a user equipment (UE) device that is being served by a serving base station, an uplink data transmission, the uplink data transmission comprising a special subframe that has a different subframe structure than a subframe structure being used by at least one other UE device being served by the serving base station, the special subframe comprising a first symbol that is at least partially blanked; and
a controller configured to decode the uplink data transmission without having a measurement-based uplink timing for the UE device.

21. A user equipment (UE) device comprising:
a receiver configured to receive scheduling information from a serving base station serving the UE device; and
a transmitter configured to transmit, to a target base station and based on the scheduling information, an uplink data transmission comprising a special subframe that has a different subframe structure than a subframe structure being used by at least one other UE device being served by the serving base station, the special subframe comprising a first symbol that is at least partially blanked, the uplink data transmission being decodable by the target base station without the target base station having a measurement-based uplink timing for the UE device.

* * * * *